United States Patent
Peters

(10) Patent No.: US 6,391,978 B1
(45) Date of Patent: May 21, 2002

(54) PROCESS FOR THE SYNTHESIS OF HYDROXYL-END GROUP FUNCTIONALIZED POLYBUTADIENES

(75) Inventor: Mark A. Peters, Mt. Pleasant, SC (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/737,199

(22) Filed: Dec. 14, 2000

(51) Int. Cl.[7] ............................................... C08C 19/00
(52) U.S. Cl. .................. 525/269; 325/337.9; 325/332.1
(58) Field of Search ......................................... 525/369

(56) References Cited

U.S. PATENT DOCUMENTS

| | | | |
|---|---|---|---|
| 5,247,023 A | 9/1993 | Chung et al. | 525/288 |
| 5,312,940 A | 5/1994 | Grubbs et al. | 556/136 |
| 5,342,909 A | 8/1994 | Grubbs et al. | 526/171 |
| 5,403,904 A | 4/1995 | Nubel et al. | 526/139 |
| 5,512,635 A | 4/1996 | Nubel et al. | 525/247 |
| 5,519,101 A | 5/1996 | Nubel et al. | 525/270 |
| 5,559,190 A | 9/1996 | Nubel et al. | 525/270 |
| 5,710,298 A | 1/1998 | Grubbs et al. | 556/22 |
| 5,728,917 A | 3/1998 | Grubbs et al. | 585/653 |
| 5,731,383 A | 3/1998 | Nubel et al. | 525/297 |
| 5,750,815 A | 5/1998 | Grubbs et al. | 585/511 |
| 5,831,108 A | 11/1998 | Grubbs et al. | 556/21 |
| 5,849,851 A | 12/1998 | Grubbs et al. | 526/93 |
| 5,880,231 A | 3/1999 | Grubbs et al. | 526/171 |
| 5,917,071 A | 6/1999 | Grubbs et al. | 556/221 |
| 5,990,340 A | 11/1999 | Haider et al. | 560/25 |
| 6,048,993 A | 4/2000 | Grubbs et al. | 556/21 |
| 6,060,570 A | 5/2000 | Nubel et al. | 526/308 |
| 6,111,121 A | 8/2000 | Grubbs et al. | 556/21 |

OTHER PUBLICATIONS

Cell. Polym. (month unavailable) 1996, 15 (6), pp. 365–416, K. C. Frisch, et al, "Polyurethane Elastomers Based Upon Novel Hydrocarbon–Based Diols".

Primary Examiner—Bernard Lipman
(74) Attorney, Agent, or Firm—Joseph C. Gil; N. Denise Brown

(57) ABSTRACT

This invention relates to a process for the synthesis and purification of hydroxyl-end group functionalized, linear, non-crosslinked polyolefins without pendant chain branched groups, and specifically to hydroxyl-end group functionalized polybutadienes. The process comprises polymerizing a cyclic olefin monomer with a chain transfer agent in the presence of a suitable catalyst, thereby forming a protected end-group functionalized polyolefin, followed by adding a mixture comprising water and caustic to the protected end-group functionalized polyolefin to remove the protecting groups, thus forming a hydroxyl end-group functionalized, linear, non-crosslinked polyolefin without pendant chain branched groups.

8 Claims, No Drawings

PROCESS FOR THE SYNTHESIS OF HYDROXYL-END GROUP FUNCTIONALIZED POLYBUTADIENES

BACKGROUND OF THE INVENTION

The present invention relates to novel, end-functionalized, linear non-crosslinked polyolefins without pendant chain branched groups and to a process for the preparation of these end-functionalized, linear, non-crosslinked polyolefins without pendant chain branched groups. This process is improved over the known process in that it utilizes water and base to remove protecting groups during processing rather than large amounts of organic solvents.

Hydroxyl-end functionalized polybutadienes synthesized via Ring Opening Metathesis Polymerization (or ROMP) are disclosed in Chung et. al. (U.S. Pat. No. 5,247,023), Grubbs, et. al. (U.S. Pat. No. 5,750,815) and Nubel, et al (U.S. Pat. Nos. 5,512,635, 5,559,190, 5,519,101 and 5,403,904). However, these polybutadienes are synthesized in a 2-step process where the first step involves polymerization and the second step involves conversion of the polymer chain ends to hydroxyl functionality.

The use of transition metal complexes to catalyze metathesis reactions with functionalized olefins is well known. U.S. Pat. Nos. 6,048,993, 6,111,121, 5,917,071, 5,831,108, 5,710,298, 5,342,909 and 5,312,940 describe the synthesis of various metathesis catalysts useful for this purpose. U.S. Pat. Nos. 5,880,231, 5,849,851, 5,750,815, 5,728,917 and 5,559,190 describe processes by which these catalysts are used to make functionalized polymers. U.S. Pat. Nos. 6,060,570, 5,731,383, 5,880,231 and 5,990,340 describe processes for making end-functionalized, linear, non-crosslinked polyolefins without chain branched groups where the cyclic olefin (1,5-cyclooctadiene) and a functionalized chain transfer agent (1,4-diacetoxy-2-butene) were used for the synthesis of linear, end-functionalized materials. The use of a difunctional chain transfer agent such as 1,4-diacetoxy-2-butene creates hydroxyl end-functionalized polybutadienes having a functionality of 2.0. In these examples, however, after polymerization, the chain ends must be converted into hydroxyl functionality to form the end-functionalized polyolefin.

Polyurethane elastomers made from these hydroxyl end-functionalized polybutadienes have been described previously (U.S. Pat. No. 5,589,543 and Cell Polym 1996, 15(6), 395). As described therein, hydroxyl end-functionalized polybutadiene was reacted with diisocyanates and extended with chain extenders to produce polyurethanes. In one example using the one-shot procedure, molten diphenyl-methyl diisocyanate (MDI) and butane diol are blended with the hydroxyl end-functionalized polybutadiene and the reaction mixture is compressed under elevated temperature and pressure to form the polyurethane. In another example, toluene diisocyanate (TDI) and the hydroxyl end-functionalized polybutadiene are reacted to form a prepolymer, and the resultant prepolymer was chain extended with methylene- bis-ortho chloroaridine (MbOCA). The mixture is then compressed under elevated temperature and pressure to form a polyurethane. The polyurethanes formed under these conditions had improved hydrolytic stability and reasonable mechanical properties. U.S. Pat. No. 5,990,340 also describes prepolymers made with hydroxyl end-functionalized polybutadiene and various diisocyanates.

Co-pending U.S. application Ser. No. 09/140,238 filed on Aug. 26, 1998, which is commonly assigned, relates to a process for preparing thermoplastic polyurethane materials. This process comprises a) casting an NCO-terminated prepolymer with 1,4-butanediol to form a casting composition, b) extruding the casting composition to form a polyurethane elastomer, c) pelleting the polyurethane elastomer to form pellets, and d) processing the pellets to form a thermoplastic material. Suitable NCO-terminated prepolymers comprise the reaction product of a polyisocyanate with an end-functionalized, linear, non-crosslinked polyolefin without pendant chain-branched groups which is prepared by reacting 1,4-diacetoxy-2-butene with 1,5-cyclooctadiene in the presence of a ruthenium complex catalyst.

The processes known and described in the art relate to the synthesis of hydroxyl end-functionalized polybutadienes and require large quantities of organic solvents such as, for example, tetrahydrofuran (or similar solvent) to saponify acetate end-groups into hydroxyl functionality. Additionally, large quantities of methanol (or similar non-solvents) must be used in the polymer purification. These solvents increase both production costs and disposal costs. Tetrahydrofuran is a hazardous material, and thus, its use and treatment is expensive and environmentally unacceptable. Accordingly, it is desirable to develop a process for the production of hydroxyl end-functionalized, linear, non-crosslinked, polyolefins without pendant chain branched groups that does not require enormous quantities of these organic solvents.

In general, improvements in the production of hydroxyl end-group functionalized polyolefins have focused on the catalysts used in the polymerization. It is the object of the present invention, however, to provide a process for the synthesis and purification of hydroxyl end-functionalized, linear, non-crosslinked, polyolefins without pendant chain branched groups with improvements in the end-group removal and purification steps. The process of the present invention uses only water and based in the end-group removal and purification steps.

SUMMARY OF THE INVENTION

This invention relates to a process for the synthesis and purification of hydroxyl end-group functionalized, linear, non-crosslinked polyolefins without pendant chain branched groups. The process comprises polymerizing a cyclic olefin monomer with a chain transfer agent in the presence of a suitable catalyst thereby forming a protected end-group functionalized polyolefin, and adding a mixture comprising water and caustic to the protected end-group functionalized polyolefin to remove the protecting groups thereby forming a hydroxyl end-group functionalized, linear, non-crosslinked polyolefin without pendant chain branched groups.

DETAILED DESCRIPTION OF THE INVENTION

A protected end-group functionalized polyolefin is formed, step (I), from the reaction product of: (A) a cyclic olefin monomer, with (B) a chain transfer agent, in the presence of (C) a suitable catalyst. After polymerization, a mixture of water and caustic is added to the protected end-group functionalized polyolefin, step (II), to remove the protecting groups thus forming the hydroxyl end-group functionalized, linear, non-crosslinked polyolefins of the present invention.

The hydroxyl end-group functionalized, linear, non-crosslinked polyolefins of the present invention are characterized as being free of pendant branched groups. These polyolefins are preferably polybutadienes, but other suitable examples include polyethylene, polypropylene, polystyrene, poly(methylpentene), polynorbornene, poly(oxanonorbornene), and similar compounds. Polyolefins of the present invention have functionalities in the range of from 1.7 to 2.2, preferably from 1.95 to 2.05, and most preferably of 2.0, as defined by vapor phase osmometry (VPO) and end group titration.

In accordance with the present invention, it is, of course, possible to use a solvent during polymerization. This is, however, less preferred. Suitable solvents include compounds such as, for example, cyclohexane, tetrahydrofuran, methylene chloride, etc.

As used herein, the terminology "free from pendant chain branched groups" describes a polymer where no pendant chain branched group(s) is (are) created during the process of making the polymer. Polymerization of monomers or chain transfer agents containing pendant side chains such as phenyl rings, pendant functionality, alkyl chains, etc, which therefore create pendant chain branched groups in the resultant polymers are, however, considered to be within the scope of the present application. In other words, polymers having pendant chain branched groups which correspond to the pendant chain branched groups of the monomers used to prepare the polymers are within the scope of the present application. For example: the polymerization of 4-methylpentene creates a polymer which contains a pendant methyl group attached to every $5^{th}$ carbon atom. Since this methyl group was present in the starting monomer, the resultant polymer is considered to be within the scope of the present invention.

In general, suitable compounds to be used as component (A) of the present invention include any cyclic olefin monomer of from 4 to about 30 carbon atoms can be utilized in the presence of a functionalized olefin to prepare the olefinic compounds of this invention. The cyclic olefins include both mono- and polycyclic unsaturated hydrocarbon compounds. Representative examples of polycyclic unsaturated hydrocarbon compounds include norbornene, norbornadiene, 2,2,2-bicyclooctene-2, dicyclopentadiene and the like.

The preferred unsaturated alicyclic compounds are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 6 carbon atoms, preferably having 4 or 5 carbon atoms in the cyclic ring and containing one double bond in the ring are cyclobutene, cyclopentene, and cyclohexene.

Representative examples of unsaturated alicyclic compounds containing at least six carbon atoms, preferably at least seven carbon atoms, in the cyclic ring and containing one or more (preferably more than one) non-conjugated carbon-to-carbon double bonds in the cyclic ring include cyclooctene; 1,4-cyclohexadiene; 1,4- and 1,5-cyclooctadiene; 1,4,7-cyclononatriene, cyclodecene, cyclododecene, 1,4-, 1,5- and 1,6 -cyclodecadiene: 1,4-, 1,5-, 1,6- and 1,7-cyclododecadiene; 1,4,7- and 1,5,9-cyclododecatriene and the like.

The most preferred unsaturated alicyclic compounds of this invention are those containing from one to three carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, and 1,5-cyclooctadiene, 1,5,9-cyclododecatriene and 1,9,17-cyclotetracosatriene.

Representative examples of substituted alicyclic compounds are alkyl-substituted compounds such as 1-methyl-1,5-cyclooctadiene; aryl-substituted compounds such as 3-phenyl-1-cyclooctene: aralkyl-substituted compounds such as 3-benzyl-1-cyclooctene; alkaryl-substituted compounds such as 3-tolyl-1-cyclooctene and halogen-substituted compounds such as a 5-chloro-1-cyclooctene, 1-chloro-1,5-cyclooctadiene; 5-chloro-1-cyclododecene and 5,6-dichloro-1-cyclooctene. Mixtures of the unsaturated alicyclic compounds are suitable, including both substituted unsaturated alicyclic compounds and the unsubstituted unsaturated alicyclic compounds.

Suitable chain transfer agents to be used as component (B) of the present invention include compounds, for example, which contain internal unsaturation and pendant functionality. Such compounds may contain more than one internally unsaturated bond, with the proviso that these are non-conjugated. In general, such compounds correspond to the structure:

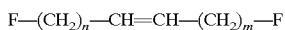

wherein:
F: represents a protected functionality such as, for example, acetate, ester, acetal, amide, epoxide, etc. and m=n, m>n, or m<n, and
wherein the sum of m plus n is greater than or equal to 1, and preferably equal to 2.

Other suitable chain transfer agents include acyclic olefins such as, for example acyclic olefins containing from 4 to 30 carbon atoms and at least one internal double bond. Some examples of such compounds include 3-hexenyl-1,6-diacetate, 10-ecosenyl-1,20-diacetate, etc. A preferred chain transfer agent is 1,4-diacetoxy-2-butene. The chain transfer agent is used to control molecular weight of the polymer, introduce functionality to the polymer chain ends, and to reduce the amount of catalyst required.

Suitable catalysts (C) for the present invention include, for example, the other known metathesis catalysts including, for example, transition metal containing catalysts such as, for example, ruthenium, osmium, titanium, tungsten, etc. Other similar metathesis catalysts which are also suitable for the present invention are known and described in, and prepared according to the process disclosed in, for example, U.S. Pat. Nos. 5,142,073, 5,198,511, 5,296,566, 5,312,940, 5,342,909 and 5,559,190, the disclosures of which are herein incorporated by reference. In a preferred embodiment of the present invention, the catalyst comprises a ruthenium metal carbene complex based compound. Most preferably, the catalyst comprises bis(tricyclohexylphosphine) benzylidene-ruthenium dichloride.

It is of course, also possible that additives are present in the process of the present invention. Suitable additives include, for example, antioxidants or other stabilizers such as, for example, light stabilizers or heat stabilizers, plasticizers, lubricants, etc.

The ring opening metathesis polymerization process (ROMP) which is used in the presently claimed process to prepare the end-functionalized polyolefins in step (I) is known and described in the prior art. See, for example, U.S. Pat. Nos. 5,750,815, 5,880,231 and 6,060,570, the disclosures of which are herein incorporated by reference.

The process according to the invention utilizes potassium or sodium hydroxide and water as the mixture comprising water and caustic of step (II). The mixture of water and caustic is added in a molar ratio (for base to protected functionality) of from about 1:1 to about 10:1, and preferably of about 1.1:1 (base to protected functionality). The addition of the water and caustic mixture to the protected end-group functionalized polyolefin removes the protecting groups to form the polyolefins of the present invention. In processes described by the prior art, base in the presence of organic solvents such as tetrahydrofuran (THF) is added to the protected end-group functionalized polyolefin to "deprotect" the polyolefin. Purification then requires a solvent such as methanol. The addition of the water and caustic replaces the use of base and organic solvents in the post-polymerization steps.

In another embodiment of the present invention, the presence of a phase transfer agent (or catalyst) may be used in the mixture of water and caustic to significantly increase the rate of reaction in the "deprotection" step. Some examples of suitable phase transfer agents include compounds such as tri-n-octylmethylammonium chloride, (i.e. Aliquat 336), sodium stearate, 1,4,7,10,13,16-hexaoxacyclooctadecane (i.e. 18-crown-6), which are all efficient in catalyzing the "deprotection" of the acetate endgroups.

The residual basic polymer resulting from the step of adding the mixture of water and caustic is neutralized with a suitable acid. Suitable neutralization acids include virtually any organic acid or inorganic acid known by one of ordinary skill in the art such as, for example, phosphoric acid, nitric acid, hydrochloric acid, sulfuric acid, oxalic acid, formic acid, acetic acid, maleic acid, adipic acid, propionic acid, butanoic acid, etc., as well as any other acid suitable to neutralize the residual base after reaction and further neutralize the alkoxide chain ends of the polymer. A preferred acid for neutralizing the basic polymer is sulfuric acid.

During the neutralization step, the acid is slowly added to the composition to neutralize the base present after completion of the deprotection reaction. In general, the concentration of the acid may be from 0 to 100% by weight, but it is preferably in the range of less than 25% by weight due to the highly exothermic nature of the neutralization process. These neutralization steps create salts, such as, for example, potassium sulfate, which are water soluble and can be removed via water wash steps with a weight ratio of water to polymer as high as 100:1, and preferably 1:1. The resulting neutralized and washed polymer is then purified by well-known methods such as filtration. Filtration is typically accomplished by any of the normal filtering processes known to those skilled in the art. The polymer is low enough in viscosity that it can be easily filtered through <10 micron filters. Filtration removes residual salts and other insoluble materials produced during polymerization and neutralization which were not removed during washing steps with water. It is necessary to neutralize the caustic and to filter the product after step (II) in order to recover a usable polymer, however, the need to treat the polymer with large amounts of solvent at this step is eliminated.

The process steps (I) and (II) can be performed sequentially, with or without isolation and purification of the products of each step. If desired, the same reaction vessel can be employed for both reactions. Optimally, all reactions should be liquid phase reactions, using neat liquid reactants, however, solvents can be used at any step to reduce viscosity or dissolve solid reactants as needed.

These reactions can be run at temperatures ranging from room temperature to >150° C. Typically, reactions are run in the range of 40 to 60° C. to prevent oxidative crosslinking during the reaction. The reaction is usually run in stainless steel reactors, but glass or glass-lined vessels in other reactors suitable for use in the production of organic materials are also suitable. High pressures may increase the rate of reaction but typically, this reaction is run at ambient pressure. Under these modest conditions, (i.e. 50% concentration of base, 50° C. reaction temperature, ambient pressure, etc.) the reaction is complete in about 2 to 4 hours as measured via Fourier Transform Infrared Spectroscopy (FTIR). Adequate mixing is required to ensure complete dispersion of the base during deprotection.

The hydroxyl end-group functionalized, linear, non-crosslinked polyolefins without pendant chain branched groups of the present invention can be used as a reactive intermediate for polyurethanes, coatings, plastics and adhesive applications to improve barrier properties, to impart low temperature impact properties and to improve chemical resistance.

In particular, the new hydroxy-functional polybutadiene (HFPB) produced by the process of the present invention is a suitable polymeric diol which contains no ester or ether bonds, but is suitable for incorporation into polyurethane applications and the like. The resulting polyurethanes would exhibit improved hydrophobicity, acid and base resistance, and impact properties in current polymer formulations. HFPB may also be suitable in polyurethane applications for thermoplastic polyurethanes (TPU;s), thin films, fibers, cast elastomers and the like, as disclosed in, for example, U.S. Pat. No. 5,990,340, the disclosure of which is herein incorporated by reference.

The compositions obtained from the process of the present invention are reacted in conventional condensation polymerization reactions to form macromolecules, conventional transesterification reactions to prepare alcohols, and conventional amination reactions to form amines, which, in turn, can be further reacted to prepare additional compounds suitable for further reactions or polymerized to form macromolecules such as polyesters, polyurethanes, polyamides, polyethers, etc.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example 1

A clean, dry reactor was filled with nitrogen. The chain transfer agent, 1,4-bis-acetoxy-2-butene (154 g, 1.8 moles) was distilled and added to the reactor. The, 1,5-cyclooctadiene (99%, unstabilized, 1760 g, 32.5 moles) was added to the reactor and nitrogen was bubbled through the solution for 30 minutes. The catalyst, bis(tricyclohexylphosphine)benylidene-ruthenium dichloride (3.06 g, 3.7 mmole) was dissolved in a minimal amount of methylene chloride under a nitrogen blanket and this solution was added to the reactor. The mixture in the reactor was slowly heated to 50° C. Since the reaction was mildly exothermic, cooling with chilled water was used to control the reaction temperature. After 8 h, vinyl acetate (0.625, 7.3 mmole) was added to the reaction to deactivate the catalyst. The mixture was stirred for another hour and cooled to 25° C. Conversion of monomer to polymer was >98 mole %, based on results from NMR of the unpurified product.

Example 2

Comparative Example—Representative of U.S. Pat. No. 5,880,231

The polymer from Example 1 was precipitated into methanol (6 L) containing hydrochloric acid (1N, 500 mL) and stirred for 1 h. The methanol solution was decanted, and the resulting polymer was again precipitated into methanol (6 L) containing hydrochloric acid (500 mL, 1N) and stirred for an hour. The methanol layer was removed and the polymer was then precipitated into pure methanol (4 L) three more times. In each case, the methanol was removed via decantation. This helps to remove any residual catalyst from the polymer. The remaining polymer was then dissolved in tetrahydrofuran (4 L) and placed into a reactor which was cooled to 0° C. Sodium methoxide (809 g, 3.7 moles, 25 wt % in methanol) was added dropwise over a period of 40 minutes and the mixture was stirred while maintaining the temperature at 0° C. for 5 hours. Then, the reaction mixture was warmed to 25° C., and precipitated into methanol (6 L) containing concentrated hydrochloric acid (pH was the controlled to maintain a pH of 4–5 for the reaction mixture). The methanol solution was then decanted and the polymer was precipitated into methanol (6 L) containing hydrochloric acid (500 mL, 1N), washed three times with 6 L of methanol containing 500 mL of water and then washed 2 times with 6 L of methanol. The methanol layer was removed via decantation. The polymer was then further purified by removing excess solvent via vacuum distillation.

The molecular weight of this polymer as measured via gel permeation chromatography was 2,600 g/mole measured versus polypropylene glycol standards. The viscosity of this polymer was measured as 800 cps at 25° C. This process resulted in a polymer yield of 50 to 60% by weight of the theoretical yield.

Example 3

The polymer described in Example 1 (800 g, 1.07 mole acetate) was added to a 2 L 4 neck, resin kettle equipped with a bottom drain. A mechanical stirrer, a condenser, a heating mantle, and a thermal couple were attached to the kettle. A 50% solution of potassium hydroxide (129 g, 1.15 mole KOH, 1.1 eq./acetate) was added to the flask and heated to 50° C. The progress of the reaction was followed by Infrared Spectroscopy (FTIR). (The reaction was considered complete upon disappearance of the C=O stretch at 1750 cm$^{-1}$). After 4 hours the reaction was complete, and the residual base was neutralized with a 25% sulfuric acid solution in water, such that the resultant solution had a pH of 5–6. The stirrer was stopped and the reaction mixture allowed to separate into 2 separate phases. The water layer was drained from the reactor and more water (~400 mL) was added to wash the remaining polymer. The material was washed at least 2 more times with an equivalent weight of water. The water was drained from the bottom of the reactor in every case. The residual water was then distilled under vacuum (20 mm Hg at 60° C.) to a level <0.05% by weight. The final polymer had an Mn (number average molecular weight) as determined by GPC (Gel Permeation Chromotography) versus polypropylene glycol standards of 2340 g/mole, an OH number of 48.5 g KOH/g polymer, and a viscosity of 900 mPa.s. The unoptimized polymer yield of this process was 80% by weight, based on the theoretical yield. The yield was unoptimized.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an hydroxyl end-group functionalized, linear, non-crosslinked polyolefin without pendant chain branched groups comprising:

(I) polymerizing
   - (A) a cyclic olefin monomer with
   - (B) a chain transfer agent in the presence of
   - (C) a metathesis polymerization catalyst;

thereby forming a protected end-group functionalized polyolefin;

(II) saponifying said protected end-group functionalized polyolefin by adding
   - (D) a mixture comprising water and caustic, to the protected end-group functionalized polyolefin to remove the protecting end-groups;

thereby forming a hydroxyl end-group functionalized, linear, non-crosslinked polyolefin without pendant chain branched groups.

2. A process for the preparation of an hydroxyl end-group functionalized, linear, non-crosslinked polyolefin of claim 1, wherein said cyclic olefin monomer (A) comprises 1,5-cyclooctadiene.

3. A process for the preparation of an hydroxyl end-group functionalized, linear, non-crosslinked polyolefin of claim 1, wherein said chain transfer agent (B) comprises 1,4-diacetoxy-2-butene.

4. A process for the preparation of an hydroxyl end-group functionalized, linear, non-crosslinked polyolefin of claim 1, wherein said catalyst (C) comprises a ruthenium carbene catalyst.

5. A process for the preparation of an hydroxyl end-group functionalized, linear, non-crosslinked polyolefin of claim 1, wherein said mixture comprising water and caustic comprises an aqueous potassium hydroxide solution or an aqueous sodium hydroxide solution.

6. A process for the preparation of an hydroxyl end-group functionalized, linear, non-crosslinked polyolefin of claim 1, additionally comprising the steps of:

(III) neutralizing the resulting polymer product of said step (II) with acid; and (IV) further purifying the resulting polymer product of step (III) by filtration; to obtain the hydroxyl end-group functionalized, linear, non-crosslinked polyolefin without pendant chain branched groups.

7. A process for the preparation of an hydroxyl end-group functionalized, linear, non-crosslinked polyolefin of claim 1, wherein said mixture of step (II) additionally comprises a phase transfer agent.

8. A process for the preparation of an hydroxyl end-group functionalized, linear, non-crosslinked polyolefin of claim 7, wherein said phase transfer agent is selected from the group consisting of tri-n-octylmethylammonium chloride, sodium stearate and 1,4,7,10,13,16-hexaoxacyclooctadecane.

* * * * *